United States Patent [19]
Kimura et al.

[11] Patent Number: 6,110,528
[45] Date of Patent: Aug. 29, 2000

[54] METHOD FOR THE PREPARATION OF FINE HOLLOW GLASS SPHERES COATED WITH TITANIUM OXIDE

[75] Inventors: Kunio Kimura, Tosu, Japan; Dae-Yong Shin, Kangwon-Do, Rep. of Korea

[73] Assignee: Agency of Industrial Science and Technology, Tokyo-to, Japan

[21] Appl. No.: 09/252,937

[22] Filed: Feb. 19, 1999

[30] Foreign Application Priority Data

Jul. 2, 1998 [JP] Japan .................................. 10-204394

[51] Int. Cl.⁷ ....................................................... B05D 7/00
[52] U.S. Cl. .......................................... 427/218; 427/215
[58] Field of Search ..................................... 427/218, 215

[56] References Cited

U.S. PATENT DOCUMENTS 5,011,674  4/1991  Yoshimoto et al. .................... 423/610
5,833,728  11/1998  Kimura et al. .......................... 427/215

*Primary Examiner*—Katherine A. Bareford
*Attorney, Agent, or Firm*—Wenderoth, Lind & Ponack, L.L.P.

[57] ABSTRACT

Disclosed is a method for the preparation of fine hollow glass spheres coated with titanium dioxide from particles of a volcanic vitreous deposit sand occurring in nature. The method comprises the steps of: (a) dispersing the starting particles in an aqueous medium containing hydrogen chloride (or sulfuric acid) and titanium chloride (or titanium sulfate); (b) admixing the aqueous dispersion of the particles with an aqueous alkaline solution such as a solution of ammonium hydrogencarbonate to effect hydrolysis of the titanium chloride (or sulfate) into hydrous titanium oxide forming a coating layer on the particles; and (c) subjecting the particles coated with hydrous titanium oxide to a heat treatment for expansion of the vitreous particles into hollow glass spheres with simultaneous conversion of the hydrous titanium oxide into titanium dioxide forming a coating layer on the hollow glass spheres.

6 Claims, 5 Drawing Sheets

METHOD FOR THE PREPARATION OF FINE HOLLOW GLASS SPHERES COATED WITH TITANIUM OXIDE

BACKGROUND OF THE INVENTION

The present invention relates to a method for the preparation of fine hollow glass spheres coated with titanium dioxide having high mechanical strengths and excellent whiteness along with a photocatalytic activity from a volcanic vitreous deposit sand as a starting material.

By virtue of the very low bulk density and excellent heat resistance, fine hollow glass spheres are highlighted in recent years as a light-weight filling material in various kinds of metallic materials, ceramics, concretes, plastics and the like. On the other hand, titanium dioxide is highlighted as a filler having photocatalytic activity in coating compositions, e.g., paints, plastics and the like. Accordingly, the demands for these materials are rapidly growing in recent years for those applications.

It is known that fine hollow glass spheres can be prepared from certain volcanic vitreous deposit sands. Japanese Patent Publication 48-17645 discloses that the so-called Shirasu sand, which is a volcanic vitreous deposit occurring in southern Kyushu Island of Japan, can be used as a starting material of fine hollow glass spheres by a method in which the Shirasu sand is calcined at a temperature in the range from 800 to 1200° C. for 10 to 600 seconds followed by density classification in water or in air. This method, however, is not suitable when the desired particle diameter of the product spheres is extremely small even by using the volcanic vitreous deposit sand having a particle diameter not exceeding 20 μm as the starting material.

Several proposals and attempts have been made for upgrading the quality of such fine hollow glass spheres. For example, Japanese Patent Publication 4-296750 and Japanese Patent Kokai 8-208272 each disclose a pretreatment of the starting material by using a hot aqueous acid solution or by using a hot aqueous solution containing aluminum sulfate and urea, respectively. Japanese Patent Kokai 9-263425 proposes a method in which the starting material is dispersed in an aqueous solution containing aluminum sulfate and then a precipitant is added to the aqueous dispersion at room temperature.

It may be an idea that fine hollow glass spheres could be imparted with photocatalytic activity by coating the particles with titanium dioxide. A possible process for the preparation of such titanium oxide-coated hollow glass spheres would be that the fine hollow glass spheres prepared beforehand by the above described methods are subjected to a coating treatment with titanium dioxide followed by a second heating treatment to stabilize the coating layer. This method is naturally far from efficient and can hardly be undertaken in industry.

SUMMARY OF THE INVENTION

The present invention accordingly has an object, in view of the above described problems, to provide an efficient and reliable method for the preparation of fine hollow glass spheres coated with titanium dioxide using a volcanic vitreous deposit sand as the starting material.

Thus, the method of the invention for the preparation of titanium oxide-coated fine hollow glass spheres comprises the steps of:

(a) dispersing particles of a volcanic vitreous deposit sand in an aqueous solution of hydrochloric acid containing titanium tetrachloride $TiCl_4$ or in an aqueous solution of sulfuric acid containing titanium sulfate $Ti(SO_4)_2$;

(b) adding an aqueous alkaline solution into the aqueous dispersion to deposit hydrous titanium oxide on the particles; and (c) subjecting the particles coated with hydrous titanium oxide to a heat treatment at a temperature in the range from 900 to 1100° C. for a length of time in the range from 1 to 60 seconds.

Alternatively, the step of depositing hydrous titanium oxide on the particles of a volcanic vitreous deposit sand can be performed by effecting a hydrolysis reaction of a titanium tetraalkoxide such as titanium tetra-n-butoxide in an ethyl alcohol solution in which the starting vitreous particles are dispersed.

DETAILED DESCRIPTION OF THE PREFERRED EMBODIMENTS

Figure 1:
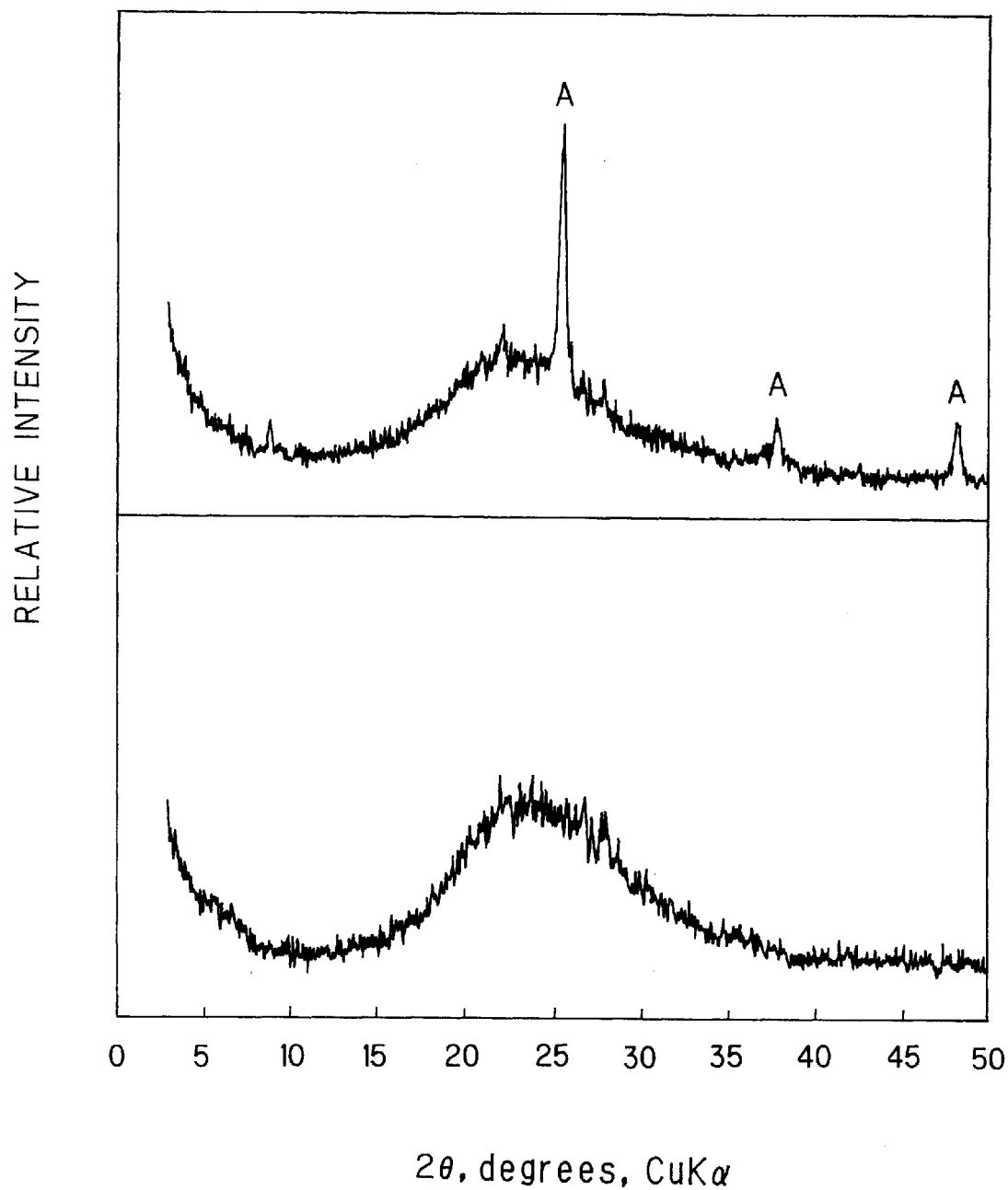
FIG. 1 shows powder X-ray diffraction patterns of the fine hollow glass sphere product prepared in Example 1 (upper) with peaks marked A for anatase and of the product prepared in Comparative Example 1 (lower).

As is understood from the above given description, the starting volcanic vitreous deposit sand is subjected to a heat treatment for expansion not as such but after formation of a coating layer of hydrous titanium oxide so that expansion of the particles to form hollow spheres proceeds efficiently under suppression of dissipation of water vapor out of the particles by the outer coating layer of hydrous titanium oxide with simultaneous in situ formation of a coating layer of titanium dioxide by the dehydration of the hydrous titanium oxide on the surface of the hollow spheric particles. It was found that the titanium dioxide thus formed in the coating layer on the particles had a crystalline form of anatase known to have good photocatalytic activity or rutile depending on the temperature of the heat treatment.

The starting material in the inventive method is a volcanic vitreous deposit sand which is a known natural material conventionally used for the preparation of fine hollow glass spheres including Shirasu, obsidian, perlite, pitchstone and the like. The chemical constituents thereof usually include $SiO_2$, $Al_2O_3$, $Fe_2O_3$, CaO, MgO, $Na_2O$ and $K_2O$ and the water content thereof is in the range from 3 to 10% by weight.

A natural supply of the volcanic vitreous deposit sand to be used as the starting material of the inventive method is first subjected to pulverization or disintegration into fine discrete particles which are subjected to particle size classification by dry or wet elutriation so as to obtain a fraction of relatively uniform particles having a diameter not exceeding 50 µm.

The particles of the volcanic vitreous deposit sand used as the starting material in the inventive method are provided with a coating layer of hydrous titanium oxide prior to the heat treatment to effect expansion of the particles into hollow spheres. Formation of the coating layer of hydrous titanium oxide can be performed in three different ways. Firstly, the starting particles are dispersed in an aqueous solution of hydrogen chloride containing titanium chloride, which is preferably titanium tetrachloride $TiCl_4$, and then an aqueous alkaline solution is gradually added dropwise to the aqueous dispersion of the particles so that the titanium chloride is hydrolyzed to deposit hydrous titanium oxide on the surface of the particles. Secondly, the starting particles are dispersed in an aqueous solution of sulfuric acid containing titanium sulfate, which is preferably titanium disulfate $Ti(SO_4)_2$, and then an aqueous alkaline solution is gradually added dropwise to the aqueous dispersion of the particles so that the titanium sulfate is hydrolyzed to deposit hydrous titanium oxide on the surface of the particles. Thirdly, the starting particles are dispersed in an ethyl alcohol solution of titanium tetra-n-butoxide which is subjected to hydrolysis by the addition of water so as to deposit hydrous titanium oxide on the surface of the particles.

In the first method, particles of a volcanic vitreous deposit sand are added to and dispersed in an aqueous hydrogen chloride solution containing titanium chloride to give an aqueous dispersion or suspension of which the solid content is in the range from 5 to 40% by weight or, preferably, from 10 to 30% by weight. The concentration of titanium chloride in the aqueous hydrogen chloride solution is at least 0.01 mole/liter or, preferably, in the range from 0.05 to 0.2 mole/liter. The concentration of hydrogen chloride in the aqueous medium is at least 0.01 mole/liter or, preferably, in the range from 0.1 to 1 mole/liter.

In the next place, an aqueous alkaline solution is gradually added to the thus prepared aqueous dispersion of the volcanic vitreous particles under agitation so that the titanium chloride is hydrolyzed to deposit hydrous titanium oxide on the surface of the particles. The aqueous alkaline solution suitable for the purpose is exemplified by the aqueous solutions of sodium hydrogencarbonate, potassium hydrogencarbonate, lithium hydrogencarbonate, ammonium hydrogencarbonate and the like either singly or as a combination of two kinds or more, of which an aqueous solution of ammonium hydrogencarbonate is preferable in respect of easiness of handling and a high yield of the hydrous titanium oxide. The concentration of the alkaline compound in the aqueous alkaline solution is 2 moles/liter or lower or, preferably, in the range from 0.5 to 1.5 moles/liter. The amount of the alkali added to the aqueous dispersion of the starting particles is in the range from 0.8 to 1.2 times of the stoichiometrically equivalent amount relative to the titanium chloride contained in the aqueous dispersion. The hydrolysis reaction of the titanium chloride by the addition of an aqueous alkaline solution to the aqueous dispersion can proceed even at room temperature although it is optional to conduct the reaction at an elevated temperature according to need.

The second method is performed under substantially the same conditions as in the first method excepting for the replacement of hydrogen chloride with sulfuric acid and titanium chloride with titanium sulfate.

In the third method, the volcanic vitreous particles as the starting material are uniformly dispersed in an ethyl alcohol solution of a titanium tetraalkoxide such as titanium tetra-n-butoxide to give a solid content of from 5 to 40% by weight or, preferably, from 10 to 30% by weight. The concentration of the titanium tetra-n-butoxide in the ethyl alcohol solution is at least 0.01 mole/liter or, preferably, in the range from 0.1 to 2 moles/liter. In the next place, water is added to the alcoholic dispersion of the starting particles to effect hydrolysis of the titanium tetra-n-butoxide. It is preferable in this case that water is added as a mixture with ethyl alcohol containing at least 0.1 mole/liter or, preferably, from 0.5 to 2 moles/liter of water. The amount of water added to the dispersion of the starting particles is, preferably, in the range from 0.8 to 1.2 times of the stoichiometrically equivalent amount relative to the titanium tetra-n-butoxide. The hydrolysis reaction of the titanium tetra-n-butoxide can well proceed even at room temperature although it is optional to conduct the reaction at an elevated temperature according to need. If necessary to accelerate the hydrolysis reaction, the reaction mixture can be admixed with a small amount of an acid or an alkali.

Thus, the surface of the volcanic vitreous particles is coated with hydrous titanium oxide so as to reduce dissipation of water contained in the particles in the form of water vapor and improve the efficiency of expansion of the particles into hollow spheres.

In the next place, the volcanic vitreous particles coated with hydrous titanium oxide are separated from the liquid medium of the dispersion by a conventional solid-liquid separating method such as decantation, filtration, centrifugal separation and the like followed by washing with water and drying to give dried particles coated with hydrous titanium oxide which are subjected to a heat treatment at a temperature in the range from 900 to 1100° C. for a length of time in the range from 1 to 60 seconds to effect expansion of the particles into hollow spheres with simultaneous formation of a coating layer of titanium dioxide by the dehydration of the hydrous titanium oxide. Since the vitreous particles under proceeding of expansion are provided with a coating layer, coalescence of the particles during the heat treatment can be efficiently prevented although some coalescence of particles may take place when the temperature is too high or the time for the heat treatment is too long.

The expanded particles obtained in the above described manner are generally light-weight fine hollow spheres which can be employed as such in many applications but it is optional to collect hollow spheres having a bulk density within a particular range by undertaking elutriation in a wet or dry process.

According to the above described inventive method, it is possible to obtain fine hollow glass spheres coated with titanium dioxide and having a particle diameter not exceeding 50 µm and a bulk density not exceeding 1 g/cm³ and capable of exhibiting high photocatalytic activity in a yield of 50% or higher based on the starting material. The titanium dioxide forming the coating layer on the hollow glass spheres is mostly in the crystalline form of anatase which exhibits higher photocatalytic activity than rutile.

The fine hollow glass spheres coated with titanium oxide obtained by the above described inventive method, which exhibit high photocatalytic activity, can be used as a light-weight filler in ceramics, concretes, plastics and the like. Since the coating layer is formed mainly of titanium dioxide of the anatase type, the coated hollow spheres per se can be efficiently utilized in the photochemical decomposition of the NOX pollutants in the atmospheric air and oily pollutants floating on water surfaces under irradiation with sunlight. Further, a cleaning effect on environmental pollution can be expected by coating various surfaces with a coating composition compounded with the fine hollow glass spheres coated with titanium oxide to be imparted with photocatalytic activity.

In the following, the method of the present invention is illustrated in more detail by way of examples, which, however, never limit the scope of the invention in any way.

Following is a description of the testing method for the mechanical strength of the fine hollow glass spheres prepared in the Examples and Comparative Examples.

A weighed amount of the sample particles contained in a sample basket of mesh screen was put into a pressurizable vessel and pressurized therein as immersed in water up to a pressure of 8 MPa to cause breaking of some particles. The sample taken out of the pressurizable vessel was recovered by filtration with a crucible-formed glass filter under suction and dried to determine the weight as dried.

The mechanical strength of the sample particles was estimated by the percentage of unbroken particles Sc calculated by the following equation:

$$Sc=[100-(Dpa^{-1}-Dp^{-1})/(D^{-1}-Dp^{-1})] \times 100,$$

in which Dpa is the bulk density of the particles in g/cm$^3$ after pressurization, Dp is the bulk density of the particles in g/cm$^3$ before pressurization and D is the density of the particles broken by pressurization, i.e. 2.35 g/cm$^3$.

EXAMPLE 1

The starting material was a powder obtained by disintegrating a volcanic vitreous deposit, called Fukushima clay, occurring in Fukushima Prefecture, Japan. This Fukushima clay had a chemical composition as follows: $SiO_2$ 74.84%; $TiO_2$ 0.07%; $Al_2O_3$ 10.74%; $Fe_2O_3$ 1.55%; MgO 0.21%; CaO 0.94%; $Na_2O$ 3.18%; $K_2O$ 2.99%; and ignition loss 5.74% (total 100.26%).

The starting powder was subjected to particle size classification at particle size separation levels of 5 μm and 10 μm by the method of water elutriation by utilizing the difference in the settling velocity of the particles, which had a particle density of 2.35 g/cm$^3$, in a liquid medium which was a 0.2% by weight aqueous solution of #3 (JIS) water glass. The thus particle size-classified powder contained less than 10% by weight of particles having a particle diameter of 10 μm or larger and 10% by weight or less of particles having a particle diameter of 5 μm or smaller.

In the next place, 20 parts by weight of the powder after particle size classification were added to 100 parts by weight of an aqueous solution containing 0.029 mole/liter of titanium tetrachloride and 0.056 mole/liter of hydrogen chloride and uniformly dispersed therein. Then, this aqueous dispersion under agitation was gradually admixed at room temperature with a 1 mole/liter aqueous solution of ammonium hydrogencarbonate in such a volume as to be stoichiometrically equivalent to effect complete hydrolysis of the titanium tetrachloride over a period of 5 hours. The particles thus coated with hydrous titanium oxide were collected by filtration, washed with water and dried.

The dried powder obtained above was introduced continuously into a furnace kept at a temperature of 1040° C. or below at such a rate that the staying time of the particles within the furnace was about 2 seconds to effect expansion of the particles into hollow spheres, which were collected and subjected to the determination of the particle density to give the results including: 1.10 g/cm$^3$ of the bulk density of the particles; 36.5% by weight of the fraction floating on water; and 91.7% by weight of the strength. The amount of titanium dioxide forming the coating layer on the particles was about 8% by weight. FIG. 1 of the accompanying drawing (upper) is a powder X-ray diffraction pattern of the thus obtained hollow glass sphere sample, in which the peaks marked A are assignable to anatase.

Comparative Example 1

The procedure was substantially the same as in Example 1 described above excepting for the omission of the coating treatment to form a coating layer of hydrous titanium oxide on the starting particles. The expanding heat treatment of the particles could not be continued through a furnace kept at 1040° C. due to melt-adhesion of a large amount of the particles onto the inner walls of the furnace but could be continued when the temperature of the furnace was decreased to 1000° C. The results of the evaluation tests included: 1.36 g/cm$^3$ of the bulk density of the particles; 24.4% by weight of the fraction floating on water; and 99.0% by weight of the strength. FIG. 1 of the accompanying drawing (lower) is a powder X-ray diffraction pattern of the thus obtained hollow glass sphere sample.

As is understood from the above given results of the evaluation tests, the bulk density of the particles after the expanding heat treatment was substantially smaller in Example 1 than in Comparative Example 1. The result of the powder X-ray diffractometry indicated that the titanium dioxide forming the coating layer on the hollow glass spheres prepared in Example 1 had a crystalline form of anatase.

EXAMPLE 2

The volcanic vitreous deposit sand used as the starting material was the same one as used in Example 1.

The starting material was disintegrated and subjected to screening by using a screen of 45 μm mesh opening to collect the fraction of particles passing the screen. The thus screened particles were further subjected to air elutriation at a separation level of 10 μm particle diameter to collect the fraction of the coarser particle size distribution, in which the content of the particles having a particle diameter smaller than 10 μm did not exceed 10% by weight.

In the next place, 25 parts by weight of the particle size-classified powder were added to 250 parts by weight of an aqueous solution containing 0.1 mole/liter of titanium tetrachloride and 0.4 mole/liter of hydrogen chloride to give an aqueous dispersion which was gradually admixed dropwise under agitation at room temperature with a 1 mole/liter aqueous solution of ammonium hydrogencarbonate over a period of 2 hours in a stoichiometrically equivalent volume to effect complete hydrolysis of the titanium tetrachloride. The particles thus coated with hydrous titanium oxide were collected by filtration, washed with water and dried.

Figure 2:
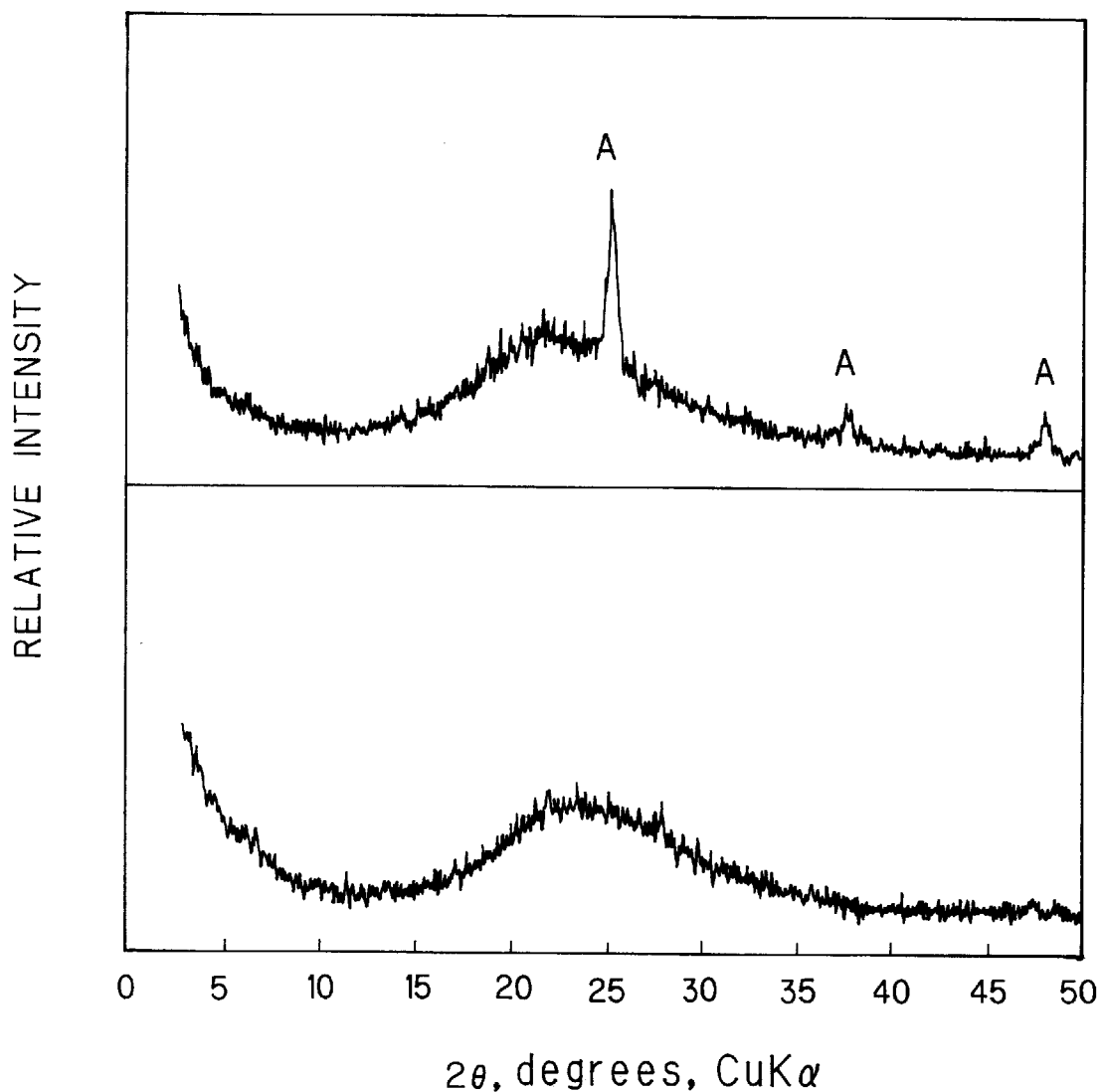
FIG. 2 shows powder X-ray diffraction patterns of the fine hollow glass sphere product prepared in Example 2 (upper) with peaks marked A for anatase and of the product prepared in Comparative Example 2 (lower).

The dried powder obtained above was introduced continuously into a furnace kept at a temperature of 1040° C. or below at such a rate that the staying time of the particles within the furnace was about 2 seconds to effect expansion of the particles into hollow spheres, which were collected and subjected to the determination of the particle density to give the result of 0.61 g/cm$^3$ of the bulk density of the particles. FIG. 2 of the accompanying drawing (upper) is a powder X-ray diffraction pattern of the hollow glass sphere sample, in which the peaks marked A are assignable to anatase.

Comparative Example 2

The procedure was substantially the same as in Example 2 described above excepting for the omission of the coating treatment to form a coating layer of hydrous titanium oxide on the starting particles. The expanding heat treatment of the particles could not be continued through a furnace kept at 1040° C. due to melt-adhesion of a large amount of the particles onto the inner walls of the furnace but could be continued when the temperature of the furnace was decreased to 1000° C. The result of the evaluation test included 0.95 g/cm$^3$ of the bulk density of the particles. FIG. 2 of the accompanying drawing (lower) is a powder X-ray diffraction pattern of the thus obtained hollow glass sphere sample.

As is understood from the above given results of the evaluation tests, the bulk density of the particles after the expanding heat treatment was substantially smaller in Example 2 than in Comparative Example 2 with omission of the coating treatment. The result of the powder X-ray diffractometry indicated that the titanium oxide forming the coating layer on the hollow glass spheres prepared in Example 2 had a crystalline form of anatase while the pattern of the sample obtained in Comparative Example 2 indicated a broad halo of the glassy phase alone.

EXAMPLE 3

An aqueous dispersion of 25 parts by weight of the same starting powder after particle size classification as used in Example 2 in 250 parts by weight of an aqueous solution containing 0.1 mole/liter of titanium sulfate and 0.2 mole/liter of sulfuric acid was gradually admixed dropwise under agitation at room temperature with a 1 mole/liter aqueous solution of ammonium hydrogencarbonate over a period of 2 hours in a stoichiometrically equivalent volume to effect complete hydrolysis of the titanium sulfate. The particles thus coated with hydrous titanium oxide were collected by filtration, washed with water and dried.

Figure 3:
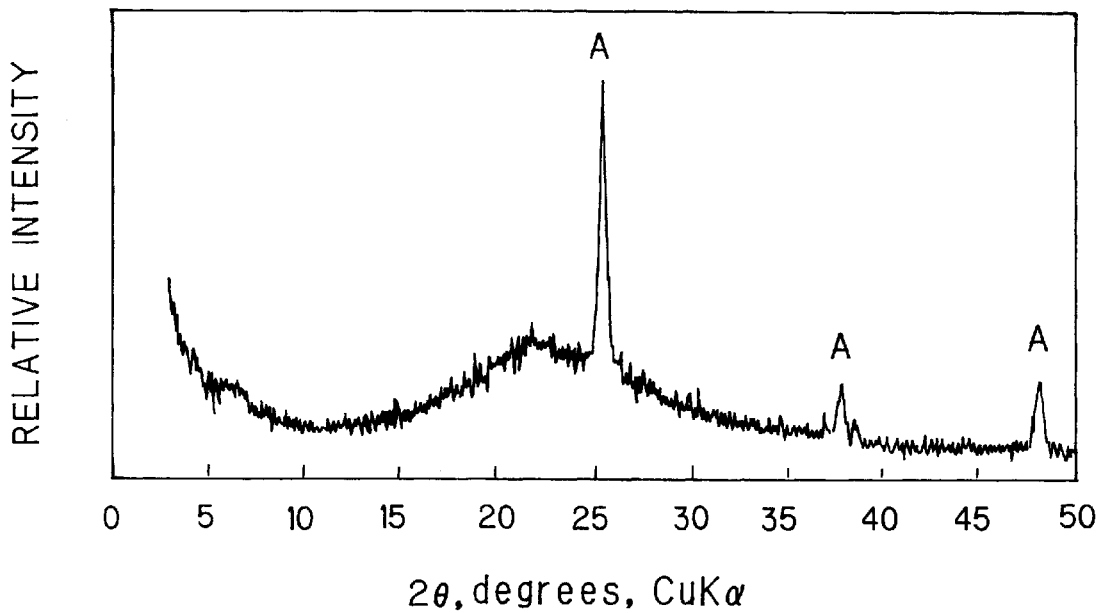
FIG. 3 shows a powder X-ray diffraction pattern of the fine hollow glass sphere product prepared in Example 3 with peaks marked A for anatase.

The dried powder obtained above was introduced continuously into a furnace kept at a temperature of 1040° C. or below at such a rate that the staying time of the particles within the furnace was about 2 seconds to effect expansion of the particles into hollow glass spheres, which were collected and subjected to the determination of the particle density to give the result of 0.73 g/cm$^3$ of the bulk density of the particles. FIG. 3 of the accompanying drawing is a powder X-ray diffraction pattern of the thus obtained hollow glass sphere sample, in which the peaks marked A are assignable to anatase.

EXAMPLE 4

A dispersion of 25 parts by weight of the same starting powder after particle size classification as used in Example 2 in 100 parts by weight of an ethyl alcohol solution containing 0.5 mole/liter of titanium tetra-n-butoxide was gradually admixed dropwise under agitation at room temperature with ethyl alcohol containing 1 mole/liter of water over a period of 2 hours in a stoichiometrically equivalent volume to effect complete hydrolysis of the titanium tetra-n-butoxide. The particles thus coated with hydrous titanium oxide were collected by filtration, washed with water and dried.

Figure 4:
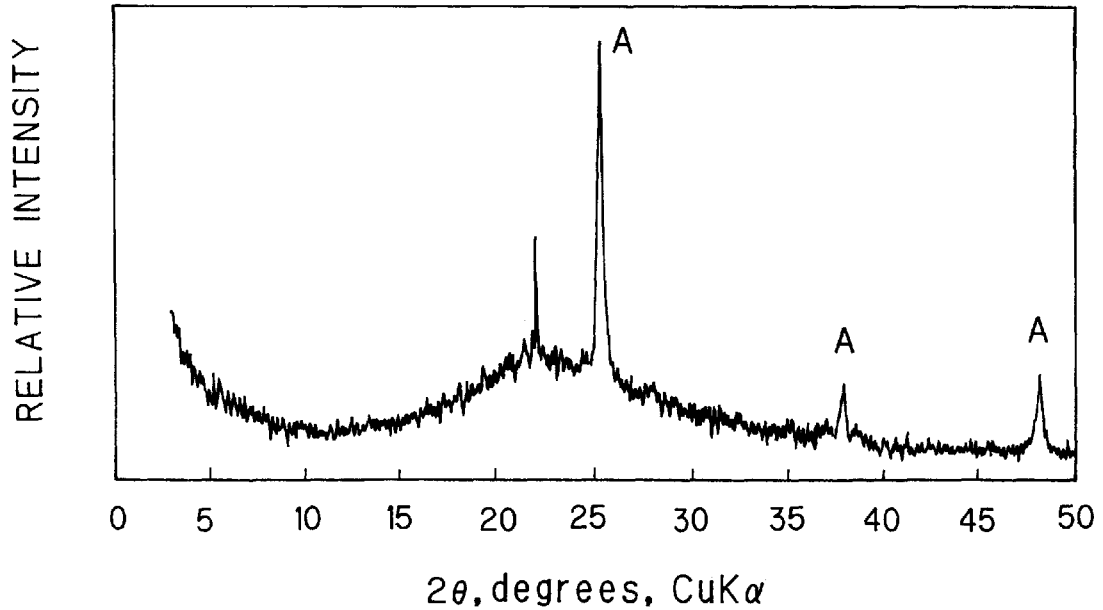
FIG. 4 shows a powder X-ray diffraction pattern of the fine hollow glass sphere product prepared in Example 4 with peaks marked A for anatase.

The dried powder obtained above was introduced continuously into a furnace kept at a temperature of 1040° C. or below at such a rate that the staying time of the particles within the furnace was about 2 seconds to effect expansion of the particles into hollow spheres, which were collected and subjected to the determination of the particle density to give the result of 0.79 g/cm$^3$ of the bulk density of the particles. FIG. 4 of the accompanying drawing is a powder X-ray diffraction pattern of the thus obtained hollow glass sphere sample, in which the peaks marked A are assignable to anatase.

EXAMPLE 5

The starting material was a powder obtained by disintegrating a volcanic vitreous deposit occurring in Shimane Prefecture, Japan. This powder had a chemical composition as follows: $SiO_2$ 71.92%; $TiO_2$ 0.29%; $Al_2O_3$ 12.38%; $Fe_2O_3$ 3.66%; MgO 0.75%; CaO 1.53%; $Na_2O$ 1.86%; $K_2O$ 1.65%; and ignition loss 5.99% (total 100.03%).

The starting powder was subjected to particle size classification at separation levels of 10 μm and 45 μm by means of wet screening using a screen of 45 μm mesh opening (JIS) and water elutriation in the same manner as in Example 1 utilizing the difference in the settling velocity of particles in water. The particles after particle size classification had an average particle diameter of 28.8 μm.

In the next place, 40 parts by weight of the particle size-classified powder were added to 100 parts by weight of an aqueous solution containing 0.029 mole/liter of titanium tetrachloride and 0.056 mole/liter of hydrogen chloride to give an aqueous dispersion which was gradually admixed drop-wise under agitation at room temperature with a 1 mole/liter aqueous solution of ammonium hydrogencarbonate over a period of 4 hours in a stoichiometrically equivalent volume to effect complete hydrolysis of the titanium tetrachloride. The particles thus coated with hydrous titanium oxide were collected by filtration, washed with water and dried.

Figure 5:
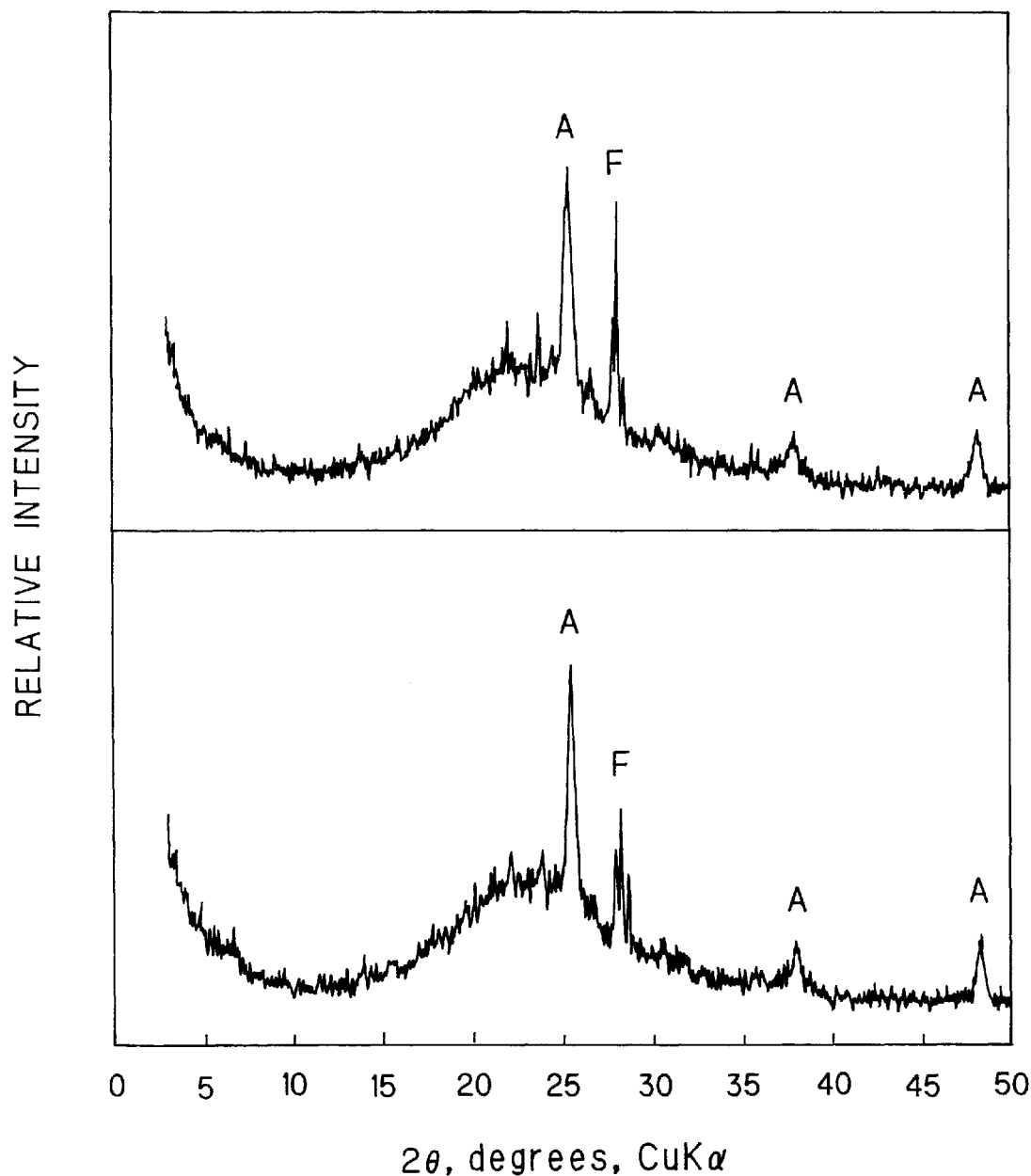
FIG. 5 shows powder X-ray diffraction patterns of the fine hollow glass sphere products prepared in Example 5 at different calcination temperatures with peaks marked A and F for anatase and feldspar, respectively.

The dried powder obtained above was introduced continuously into a furnace kept at a temperature of 960° C. or below or 1000° C. or below at such a rate that the staying time of the particles within the furnace was about 2 seconds to effect expansion of the particles into hollow spheres, which were collected and subjected to the determination of the particle density, fraction of particles floating on water and strength of particles to give the results including: 0.60 g/cm$^3$ of the bulk density of the particles; 56.7% by weight of floating particles; and 98.0% by weight of the particle strength when the furnace temperature was 960° C. or below; and 0.30 g/cm$^3$ of the bulk density of the particles; 73.2% by weight of floating particles; and 72.0% by weight of the particle strength when the furnace temperature was 1000° C. or below. FIG. 5 of the accompanying drawing shows powder X-ray diffraction patterns of the hollow glass sphere samples for the furnace temperatures of 960° C. or below (upper) and 1000° C. or below (lower), in which the peaks indicated by A and F are for the crystalline forms of anatase and feldspar, respectively.

EXAMPLE 6

The starting material was a powder obtained by disintegrating a volcanic vitreous deposit occurring in Kagoshima Prefecture, Japan. This powder had a chemical composition as follows: $SiO_2$ 73.68%; $TiO_2$ 0.16%; $Al_2O_3$ 12.38%; $Fe_2O_3$ 1.96%; MgO 0.33%; CaO 1.47%; $Na_2O$ 2.96%; $K_2O$ 2.72%; and ignition loss 3.33% (total 98.99%).

The starting powder was subjected to particle size classification at separation levels of 150 μm and 300 μm by means of wet screening using screens of 150 μm and 300 μm mesh openings (JIS). Thereafter, the particles were subjected to sink-float separation by using an aqueous solution of zinc bromide having a density of 2.4 g/cm³ to give particles of the volcanic vitreous deposit having a density not exceeding 2.4 g/cm³.

In the next place, 10 parts by weight of the particle size-classified powder were added to 100 parts by weight of an aqueous solution containing 0.047 mole/liter of titanium tetrachloride and 0.188 mole/liter of hydrogen chloride to give an aqueous dispersion which was gradually admixed dropwise under agitation at room temperature with a 1 mole/liter aqueous solution of ammonium hydrogencarbonate over a period of 8 hours in a stoichiometrically equivalent volume to effect hydrolysis of the titanium tetrachloride. The particles thus coated with hydrous titanium oxide were collected by filtration, washed with water and dried. The dried particles had a density of 2.35 g/cm³.

Figure 6:
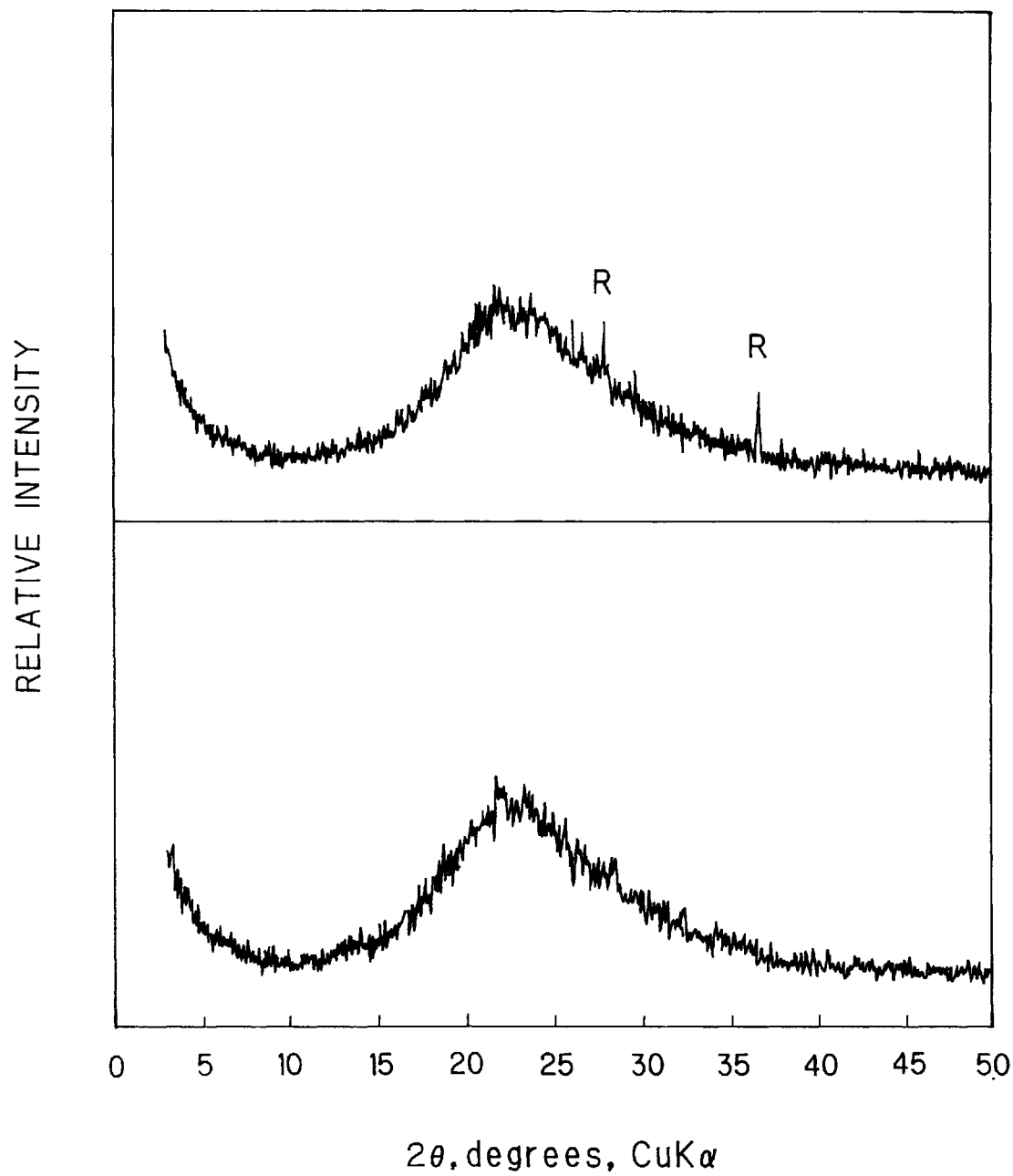
FIG. 6 shows powder X-ray diffraction patterns of the fine hollow glass sphere product prepared in Example 6 (upper) with peaks marked R for rutile and of the product prepared in Comparative Example 3 (lower).

The dried powder obtained above was introduced continuously into a furnace kept at a temperature of 940° C. or below at such a rate that the staying time of the particles within the furnace was 60 seconds to effect expansion of the particles into hollow spheres, which were collected and subjected to the determination of the particle density, fraction of particles floating on water and strength of particles to give the results including: 0.85 g/cm³ of the bulk density of the particles; 47.7% by weight of floating particles; and 83.3% by weight of the particle strength. FIG. 6 (upper) of the accompanying drawing shows a powder X-ray diffraction pattern of the hollow glass sphere sample, in which the peaks marked R are assignable to the crystalline form of rutile.

Comparative Example 3

The procedure was substantially the same as in Example 6 excepting for the omission of coating of the particles with hydrous titanium oxide. The hollow glass sphere particles after expansion by heating had substantially the same bulk density of the particles, floating particles and particle strength as in Example 6. FIG. 6 (lower) of the accompanying drawing shows a powder X-ray diffraction pattern of the hollow glass sphere sample indicating only a broad halo.

What is claimed is:

1. A method for the preparation of titanium dioxide-coated fine hollow glass spheres which comprises the steps of:
   (a) dispersing particles of a volcanic vitreous deposit sand in an aqueous solution of hydrogen chloride containing titanium chloride or in an aqueous solution of sulfuric acid containing titanium sulfate;
   (b) adding an aqueous alkaline solution into the aqueous dispersion to deposit hydrous titanium oxide on the particles; and
   (c) subjecting the particles coated with hydrous titanium oxide to a heat treatment at a temperature in the range from 900 to 1100° C. for a length of time in the range from 1 to 60 seconds.

2. The method for the preparation of titanium dioxide-coated fine hollow glass spheres as claimed in claim 1 in which the aqueous alkaline solution is an aqueous solution of ammonium hydrogencarbonate.

3. The method for the preparation of titanium dioxide-coated fine hollow glass spheres as claimed in claim 1 in which the amount of the particles of the volcanic vitreous deposit sand in the aqueous dispersion is in the range from 5 to 40% by weight based on the aqueous solution of hydrogen chloride or sulfuric acid.

4. The method for the preparation of titanium dioxide-coated fine hollow glass spheres as claimed in claim 1 in which the concentration of titanium chloride or titanium sulfate in the aqueous solution of hydrogen chloride or sulfuric acid, respectively, is in the range from 0.05 to 0.2 mole/liter.

5. The method for the preparation of titanium dioxide-coated fine hollow glass spheres as claimed in claim 1 in which the concentration of hydrogen chloride or sulfuric acid in the aqueous solution of hydrogen chloride or sulfuric acid is in the range from 0.1 to 1 mole/liter.

6. The method for the preparation of titanium dioxide-coated fine hollow glass spheres as claimed in claim 1 in which the aqueous alkaline solution contains an alkaline compound in a concentration in the range from 0.5 to 1.5 moles/liter.

* * * * *

UNITED STATES PATENT AND TRADEMARK OFFICE
CERTIFICATE OF CORRECTION

PATENT NO. : 6,110,528
DATED : August 29, 2000
INVENTOR(S) : Kunio Kimura et al.

It is certified that error appears in the above-identified patent and that said Letters Patent is hereby corrected as shown below:

Title page,
Item [73], Assignee should read:

-- Japan as represented by Director General of Agency of Industrial Science and Technology --.

Signed and Sealed this

Nineteenth Day of October, 2004

JON W. DUDAS
*Director of the United States Patent and Trademark Office*